(12) United States Patent
Wang

(10) Patent No.: US 7,138,621 B2
(45) Date of Patent: Nov. 21, 2006

(54) OPTICAL FIBER SENSORS BASED ON PRESSURE-INDUCED TEMPORAL PERIODIC VARIATIONS IN REFRACTIVE INDEX

(75) Inventor: Anbo Wang, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 334 days.

(21) Appl. No.: 10/431,456

(22) Filed: May 8, 2003

(65) Prior Publication Data

US 2003/0209655 A1 Nov. 13, 2003

Related U.S. Application Data

(60) Provisional application No. 60/378,351, filed on May 8, 2002.

(51) Int. Cl.
*G01J 1/04* (2006.01)
*G01J 4/00* (2006.01)
*G02B 6/26* (2006.01)
*G02B 6/34* (2006.01)

(52) U.S. Cl. ............................. 250/227.14; 250/227.18; 385/28; 385/37

(58) Field of Classification Search ............... 359/569, 359/566, 558; 385/13, 12, 37, 31, 28, 27; 422/82.05, 82.12, 87.13; 250/227.18, 227.14
See application file for complete search history.

(56) References Cited

U.S. PATENT DOCUMENTS

| 5,641,956 A * | 6/1997 | Vengsarkar et al. ... 250/227.14 |
| 5,757,540 A * | 5/1998 | Judkins et al. ......... 359/337.21 |
| 6,282,341 B1 * | 8/2001 | Digonnet et al. ............. 385/37 |

* cited by examiner

*Primary Examiner*—Georgia Epps
*Assistant Examiner*—Don Williams
(74) *Attorney, Agent, or Firm*—DLA Piper Rudnick Gray Cary US LLP

(57) ABSTRACT

A optical fiber sensor for measuring temperature and/or pressure employs temporally created long period gratings. The gratings may be produced by a periodic change in the refractive index of the fiber along the fiber longitudinal axis caused by periodically spaced compressive and/or expansive forces or by spaced-apart unbalanced forces that cause periodic fiber micro-bending. Pressure and temperature are determined by measuring changes in both the wavelength at which light is coupled from a mode guided by a core to a different mode and an amount of such coupling. The gratings are created intrinsically and extrinsically. Single and multiple core fibers are used.

18 Claims, 9 Drawing Sheets

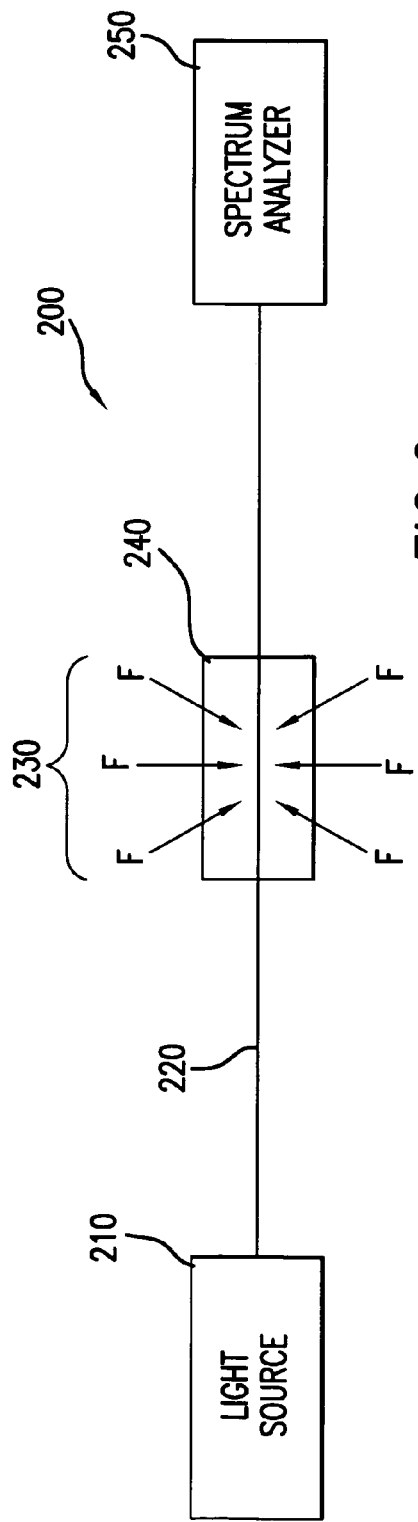
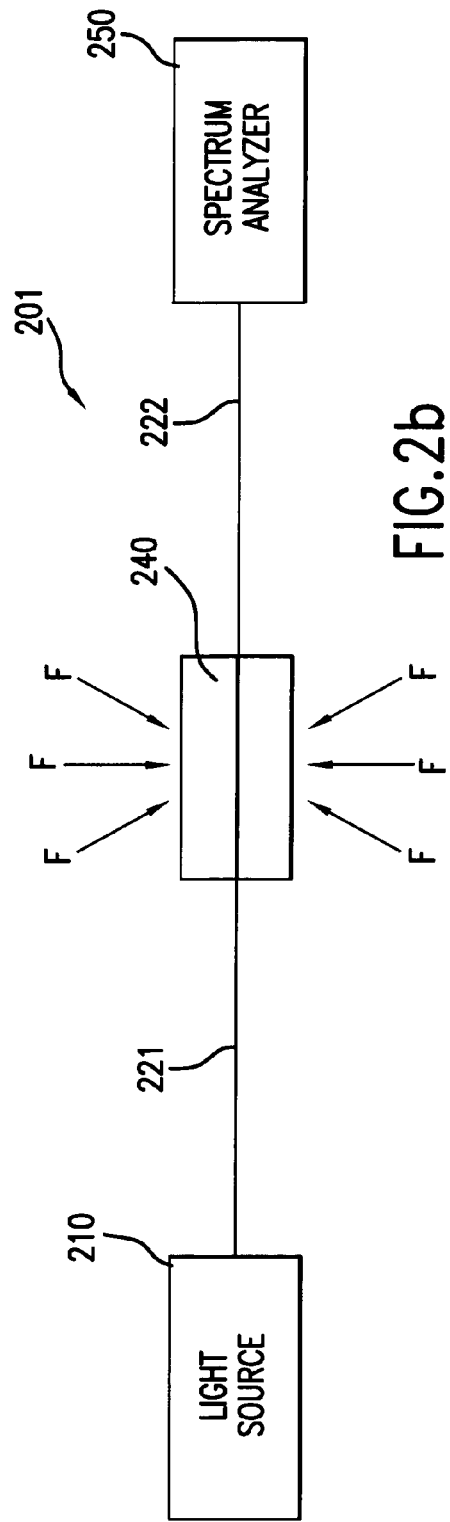

OPTICAL FIBER SENSORS BASED ON PRESSURE-INDUCED TEMPORAL PERIODIC VARIATIONS IN REFRACTIVE INDEX

CROSS REFERENCE TO RELATED APPLICATIONS

This application claims the benefit of U.S. Provisional Application Ser. No. 60/378,351, filed May 8, 2002, the contents of which are hereby incorporated by reference herein.

BACKGROUND OF THE INVENTION

1. Field of the Invention

The invention relates to fiber optic sensors generally, and more specifically to fiber optic sensors employing pressure-induced periodic gratings.

2. Discussion of the Background

Optical fiber sensors are becoming more popular for a wide variety of applications. Optical fiber sensors offer several advantages over other types of sensors such as electronic and mechanical sensors. Optical fiber sensors are generally more rugged and have longer lifetimes than these other types of sensors, are immune from electromagnetic interference, can often be made much smaller than these other types of sensors, and offer multiplexing capabilities.

One type of optical fiber sensor known in the art is the grating-based fiber optic sensor. These types of sensors employ an optical grating comprising a series of refractive index perturbations spaced along an optical fiber. The spacing is generally fixed, but "chirped" gratings with varying spacing are also known in the art. The optical grating can be either of two types—short period gratings (also referred to as Bragg gratings) and long period gratings.

Short period gratings have a periodic spacing less than the wavelength of an operating light source, typically less than one micron. These gratings convert light traveling in the forward-propagating guided fundamental mode to the reverse-propagating fundamental mode; that is, light traveling in the forward direction in the core of the fiber is reflected backward into the core by the grating. The wavelength of the reflected light depends upon the spacing in the grating. Therefore, if the spacing is changed, such as by expansion of the fiber due to a temperature increase or by compression or stretching of the fiber due to mechanical forces, a corresponding shift in the wavelength of the reflected light will occur. By applying broadband light to the fiber and analyzing the spectrum of the light reflected by the grating (or, conversely, by analyzing the spectrum of the light that passes the grating), the change in grating spacing, and thus the corresponding change in temperature and/or mechanical force applied to the fiber) can be determined. Short period gratings with periodic spacings of less than one micron have been widely used as temperature and strain sensors.

In contrast to short period gratings, long period gratings have a spacing greater than the wavelength of the operating light source. Typical spacings are between 15 and 1500 microns. Unlike short period gratings which reflect light backward into the core of the fiber, long period gratings couple light from a forward propagating mode in the core to another mode not guided by the core. For example, U.S. Pat. No. 5,641,956 describes sensor arrangements involving long period gratings in which light is coupled from the forward propagating fundamental mode in the core to a mode guided by the cladding of the optical fiber, where it is attenuated due to the lossy nature of the cladding mode. Alternatively, light traveling in the forward propagating fundamental mode can be converted into a higher order forward propagating mode guided by the core and subsequently stripped out to provide a wavelength-dependent loss.

The wavelength of light for which coupling occurs in the long period gratings is dependent upon the spacing of the grating. Thus, by examining the spectrum of the light that continues to be guided by a core of a fiber after passing through a long period grating formed in the core, changes in the spacing of the grating corresponding to changes in temperature and/or mechanical forces can be detected and measured.

Long period gratings can be formed using photolithographic processes involving the exposure of a doped (to increase photosensitivity) optical fiber to ultraviolet radiation. An example of such a process is described in U.S. Pat. No. 5,757,540. The amount of change in the refractive index caused by such gratings is generally permanent. The amplitude of the attenuation resulting from such gratings generally varies little when pressure perturbations are applied to this grating. Additionally, any changes in the amplitude of the attenuation peaks depends on temperature, pressure and strain, and it is therefore difficult to use a single grating of this type to measure any of these if they are present at the same time.

U.S. Pat. No. 6,282,341 describes optical fiber filters employing long period gratings formed by arcing across the fiber, such as with a commercial fiber splicer, at periodic intervals and/or by periodically stressing the fiber such as by maintaining pressure on a plate with milled periodically spaced ridges against the fiber. This patent includes no description or suggestion of employing long period gratings formed in such a manner in a sensor.

SUMMARY

The present invention provides several novel optical fiber sensors employing temporally created long period gratings. The gratings may be produced by a periodic change in the refractive index of the fiber along the fiber longitudinal axis caused by localized, spaced-apart compressive and/or expansive forces or by spaced-apart unbalanced forces that cause periodic fiber micro-bending. In preferred embodiments of the invention, the sensors simultaneously measure both pressure and temperature by observing changes in both the wavelength at which light is coupled from a mode guided by a core to a different mode and an amount of such coupling.

The invention provides different ways to create the long period gratings. In some embodiments, the gratings are created intrinsically (that is, without the assistance of mechanical devices external to the optical fiber) by modifying the fiber cladding such pressure applied to the fiber will create periodically varying stresses in the core of the fiber. In other embodiments, the gratings are created extrinsically by mechanical devices operating on the optical fiber.

In another aspect of the invention, some embodiments of the invention employ a single core fiber and the long period grating couple light from a fundamental mode in the core to a mode guided by the cladding (also sometimes referred to as a non-guided mode). In other embodiments of the invention, a dual core fiber is used and the long period grating couples light from a fundamental mode in one core to a fundamental mode in the second core. The cores may be either concentric or spaced apart. In embodiments with spaced-apart cores, the cores may be located inside a single optical fiber (i.e., surrounded by a single, common cladding) or may be located in separate optical fibers.

BRIEF DESCRIPTION OF THE DRAWINGS

A more complete appreciation of the invention and many of the attendant features and advantages thereof will be readily obtained as the same become better understood by reference to the following detailed description when considered in connection with the accompanying drawings, wherein:

FIGS. 2(a) and 2(b) are block diagrams of sensor systems according to first and second embodiments of the invention.

DETAILED DESCRIPTION

The present invention will be discussed with reference to preferred embodiments of optical sensors and optical sensor systems. Specific details are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

As used herein, "circumferential" means around a circumference of the optical fiber. The circumference may be perpendicular to the core of the fiber such the circumference forms a ring, or may be offset from the perpendicular such that the circumference forms an oval.

Figure 1:
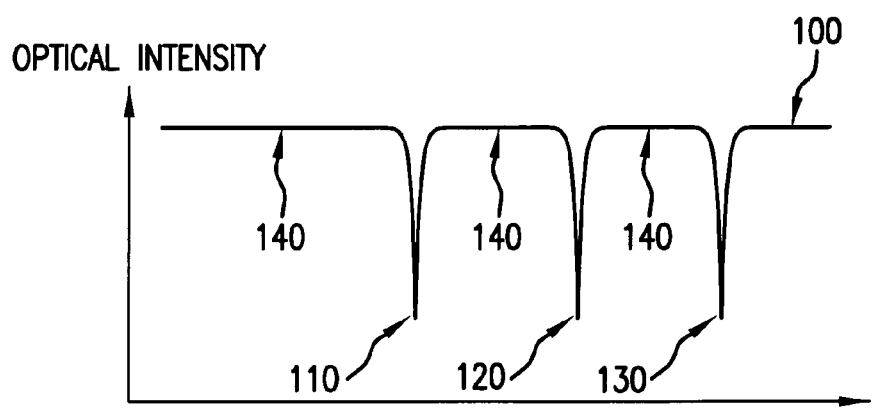
FIG. 1 represents a transmission spectrum diagram of a sensor according to an embodiment of the invention.

Referring now to the drawings, wherein like reference numerals designate identical or corresponding parts throughout the several views, FIG. 1 illustrates an exemplary transmission spectrum diagram for a sensor of the present invention. The curve 100 of FIG. 1 represents optical intensity of light transmitted through a core of an optical fiber sensor (not shown in FIG. 1) according to the present invention as a function of wavelength of the light. The curve 100 includes a first order attenuation peaks 110 and higher order attenuation peaks 120, 130 as well as several non-attenuated areas 140. The amplitude of the attenuation peaks 110–130 are indicative of an amount of light coupled from the guided mode of the core to another mode (e.g., a non-guided, lossy cladding mode or a guided mode in another core). The amplitude of the peaks is a function of force exerted on the fiber. The spectral locations of the peaks are a function of the spacing of the gratings, which is primarily dependent on temperature. In dual core embodiments of the invention in which light is coupled from a first core to a second core, the second core will exhibit a spectrum with transmission peaks corresponding to the attenuation peaks 110–130 of FIG. 1, with the amplitude of the transmission peaks being indicative of an amount of light coupled from the first core.

An exemplary sensor system 200 is illustrated in FIG. 2(a). The system includes a light source (e.g., a broadband light source) 210 connected to an optical fiber 220. The optical fiber 220 may include a single core or may include two cores. The optical fiber 220 includes a sensor area 230 that is at least partially surrounded by a force exertion device 240. The force exertion device 240 may take a variety of forms. In some embodiments, the force exertion device 240 comprises a tube. In other embodiments, it comprise one or a pair of plates. In yet other embodiments, such as those embodiments in which the grating is created intrinsically, the force exertion device 240 takes the form of an enclosure filled with a pressurized fluid (such as a gas or a liquid).

A spectrum analyzer 250 is connected to the optical fiber 220 to measure the spectrum of light transmitted through the sensor region 230 of the fiber 220. As discussed above, the position of the attenuation peaks (or the transmission peaks in the second core of dual core embodiments of the invention) depends primarily on temperature, and the amplitude of the peaks depends primarily on pressure. The amplitude of the peaks may be determined by comparing the amplitude at a wavelength at which coupling occurs with an amplitude at a wavelength at which no coupling occurs. Thus, by simultaneously measuring the spectral position and amplitude of the attenuation peaks in the first core and/or the transmission peaks in the second core with the spectrum analyzer, the temperature and pressure can be determined simultaneously.

It should be noted that a certain level of cross-sensitivity between the pressure and temperature measurement may occur. That is, temperature variations may also effect the magnitudes of the attenuation peaks and pressure changes may also affect the spectral positions of the attenuation peaks through physical effects such as pressure-induced dimensional changes along the fiber longitudinal axis and temperature-induced changes to the refractive index. However, the non-uniform refractive index variations along the fiber longitudinal axis are primarily caused by the applied pressure; thus, the magnitudes of the attenuation peaks (i.e., the amount of light coupled from a mode guided by the core to another mode) are primarily dependent upon applied pressure.

An alternative embodiment of a sensor system 201 for use with embodiments of the invention employing dual core sensors with each of the cores in separate fibers is illustrated in FIG. 2(b). A light source 210 is connected to a first optical fiber 221. A second optical fiber 222 is positioned adjacent to the first optical fiber 221 such that some of the light guided by the core of the first optical fiber 221 is coupled to the core of the second optical fiber 222 when pressure is applied to the first optical fiber 221. The spectrum analyzer 250 is connected to measure the amount and spectral position of light coupled to the core of the second optical fiber 222.

Figure 3:
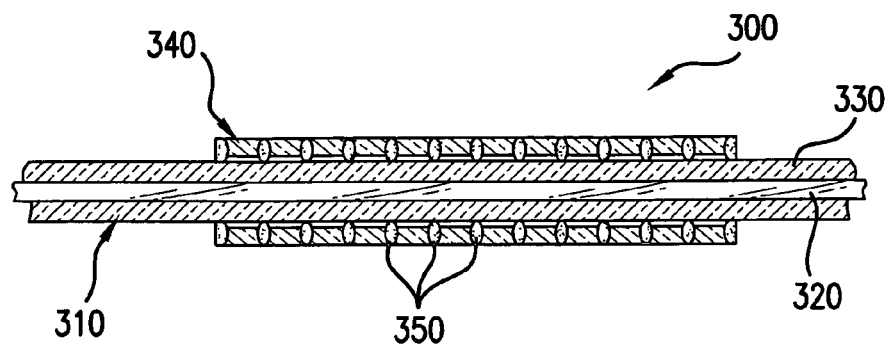
FIG. 3 is a cross sectional view of an extrinsic optical fiber sensor according to a third embodiment of the invention.

A cross-sectional view of an extrinsic, single core sensor 300 is illustrated in FIG. 3. A portion of an optical fiber 310 with a single core 320 surrounded by a cladding 330 is disposed inside a tube 340. The tube 340 may be comprised of metal, glass, or other materials. The tube is bonded to the fiber at periodically spaced locations 350. Bonding between the tube 340 and fiber 310 may be accomplished by thermal fusion. In a highly preferred embodiment, the tube 340 is glass and bonding between the tube 340 and the fiber 310 is accomplished by applying a laser to the tube 340 at a sufficient power to melt localized portions of the tube 340 and fiber 310 such that a bond is formed. The bonding between the tube 340 and fiber 310 may be circumferential. In other embodiments, the bond may be formed at localized areas on opposite sides of the tube 340.

When the sensor 300 is exposed to pressure, the pressure changes the density of the fiber core 320 and hence its index of refraction over the bonded regions, while other regions where the fiber 310 is not bonded to the tube 340 do not experience the externally applied pressure (or experience lesser amounts of pressure) and therefore do not experience any change (or experience a smaller change) in refractive index. Consequently, the index of refraction of the fiber core 320 is changed periodically, thereby forming a long period grating. The period is determined by the period of the bonding between the fiber 310 and the tube 340.

Figure 4A:
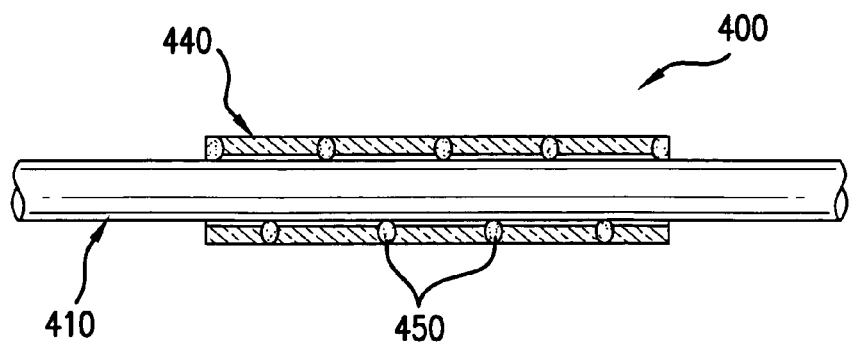
FIGS. 4(a) and (b) are cross sectional views of an extrinsic optical fiber sensor according to a fourth embodiment of the invention.
Figure 4B:
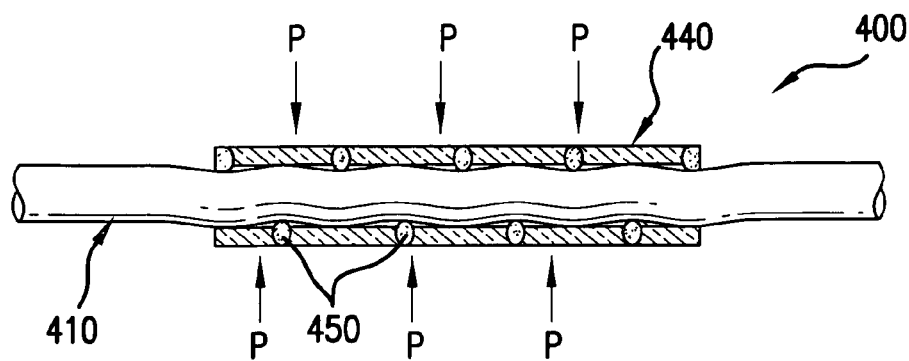
FIG. 4(c) is a side view of an extrinsic optical fiber sensor according to a fifth embodiment of the invention.

A cross-sectional view of an extrinsic, single core (not shown) sensor 400 is shown in FIGS. 4(a) and 4(b). The bonds between the fiber 410 and tube 400 at the bonding locations 450 of sensor 400 are offset such that the fiber 400 undergoes micro-bending at bonding locations 450 as shown in FIG. 4(b). This should be contrasted with the sensor 300, in which there are opposing bonds between the tube 340 and fiber 310 at each of bonding locations 350 such that the core 320 is compressed when the tube 340 is exposed to pressure P, but in which micro-bending does not generally occur.

Figure 4C:
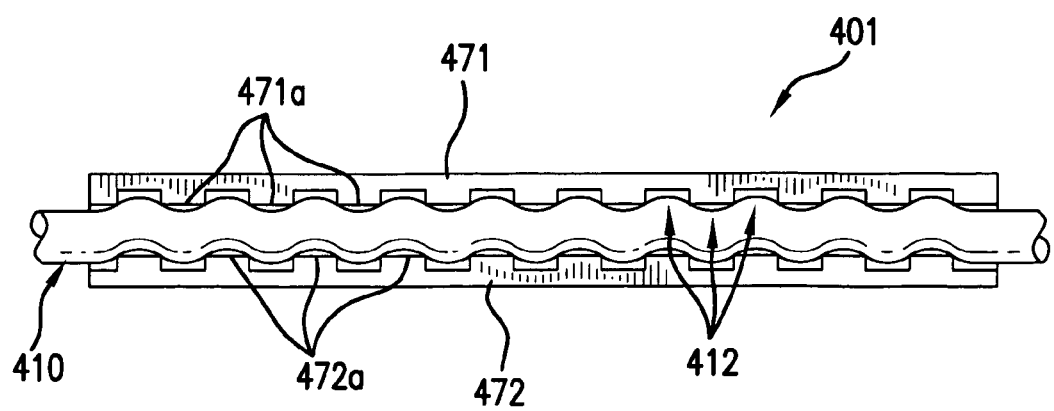

An alternative embodiment of an extrinsic, single core sensor 401 is illustrated in FIG. 4(c). The sensor 401 employs a pair of plates 471, 472 with one of the plates 471 having a plurality of ridges 471a that are offset with respect to a plurality of ridges 472a of the second plate 472. When opposing forces are applied to the plates 471, 472, the opposing ridges 471a, 472b form a series of micro-bends 412 in the optical fiber 410. The ridges 471a, 472a are spaced such that the micro-bends result in a long period grating being formed that couples light from a mode guided by the core of the fiber 410 to another mode.

Figure 7A:
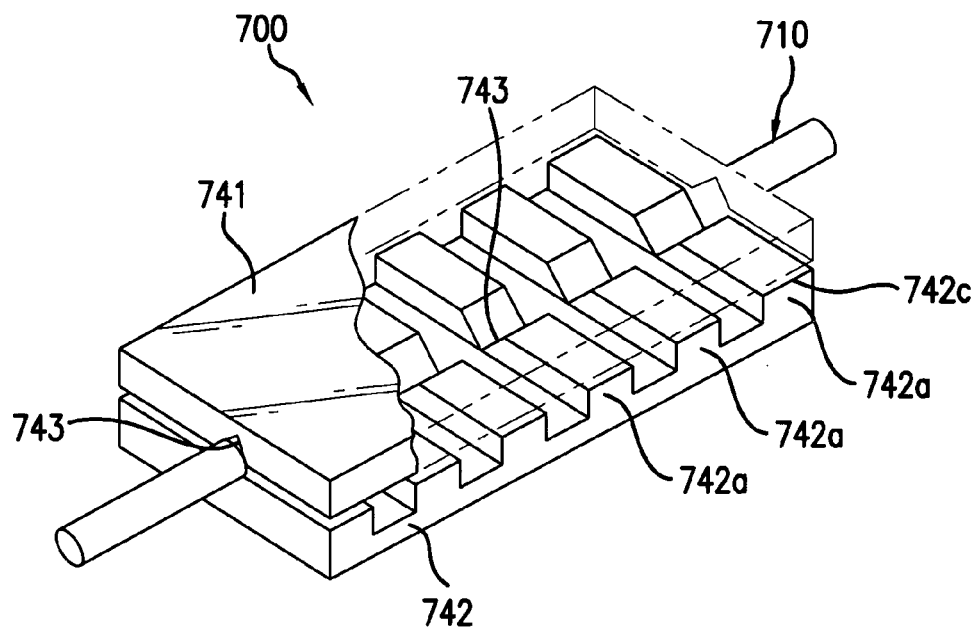
FIGS. 7(a) and (b) are perspective and cross sectional views, respectively, of an extrinsic optical fiber sensor according to an eighth embodiment of the invention.
Figure 7B:
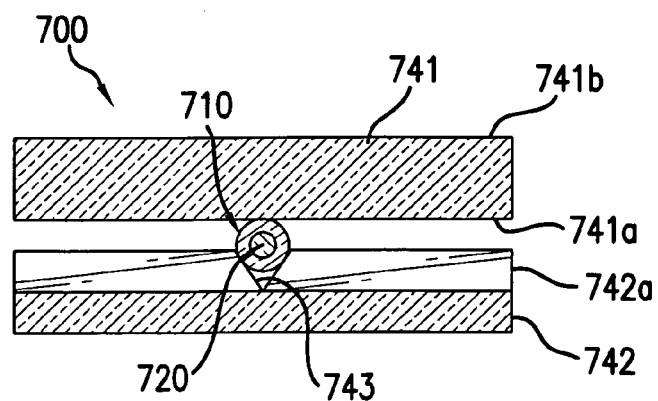

FIGS. 7(a) and 7(b) are perspective and cross-sectional views, respectively, of yet another alternative embodiment of an extrinsic, single core sensor 700 according to the present invention. The sensor 700 employs a pair of plates 741, 742 in place of the tube 340 of the sensor 300. In the sensor 700, one plate 741 has two smooth sides 741a, 741b. The second plate 742 has a plurality of flat-topped ridges 742a formed on a side adjacent to the optical fiber 710. The ridges 742a are periodically spaced such that a long period grating is created in the core 720 of the fiber 710 when opposing forces are applied to the plates 741, 742 due to changes in refractive index in localized areas of the core 720 caused by compression of the core 720 by the ridges 742a. A groove 743 may be formed through the ridges 742a to keep the fiber 710 in position between the plates 741, 742; however, such a groove 743 is not strictly necessary.

In other embodiments of the sensor 700, both of plates 741, 742 may be provided with ridges 742a. In yet other embodiments, the ridges 742a may have cross sectional shapes with angled sides rather than sides formed at right angles to the flat tops 742(c) of the ridges 742(b) as shown in FIG. 7. In still further embodiments, the groove 743 may be curved (rather than straight) to produce a chirped grating. When a straight groove 743 is used, the groove 743 may be at an angle with respect to the ridges 742a rather than parallel as shown in FIG. 7.

Figure 5A:
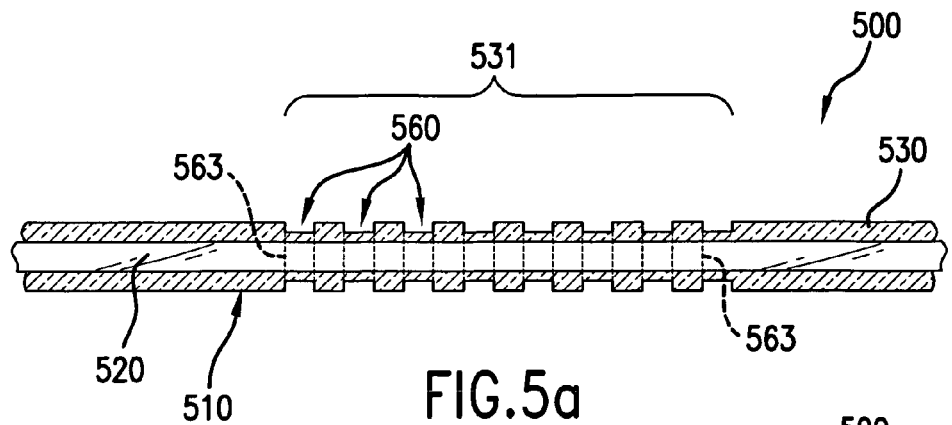
FIGS. 5(a) and (b) are cross sectional views of an intrinsic optical fiber sensor according to a sixth embodiment of the invention.

FIG. 5(a) illustrates an intrinsic, single core sensor 500 according to another embodiment of the invention. Unlike the extrinsic sensors of FIGS. 3 and 4, the intrinsic sensor of FIG. 5 does not require a mechanical device such as a tube 340, 440 to produce a long period grating. The sensor 500 includes a fiber 510 with a single core 520 surrounded by a cladding 530. The cladding 530 has a plurality of circumferential grooves 560 formed therein in a sensor region 531. The side walls 563 of the grooves 560 are illustrated in phantom in FIG. 5(a).

Figure 5B:
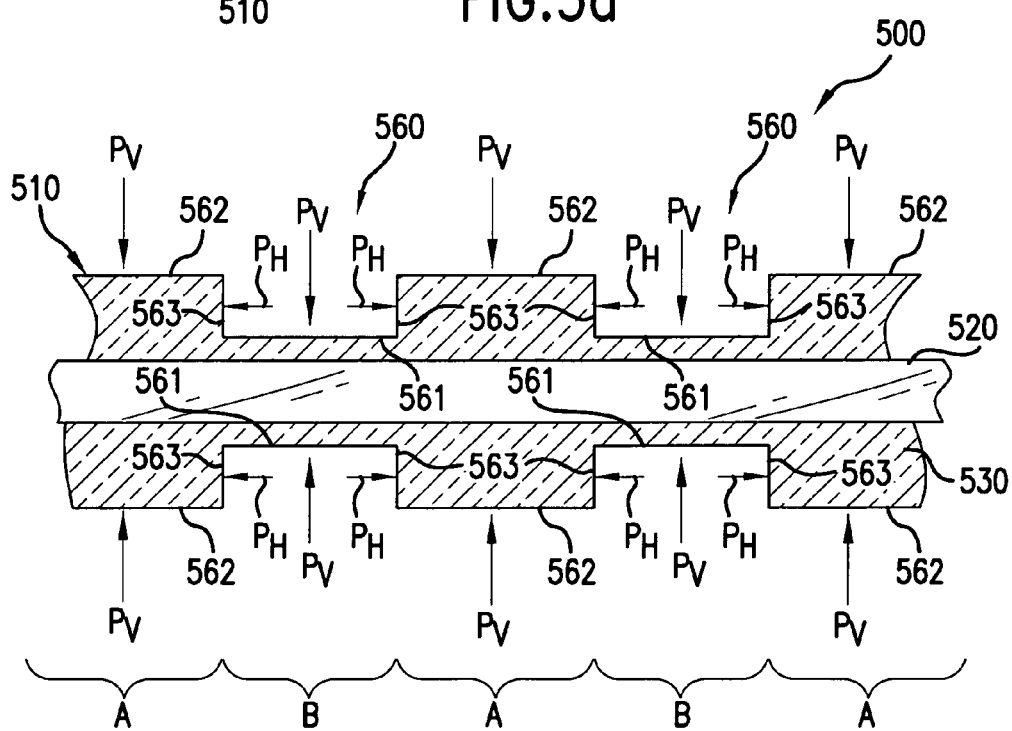

Referring now to FIG. 5(b), which illustrates a portion of the sensor 500, when the sensor 500 is exposed to pressure, vertical forces $P_V$ act on each of the bottom surfaces 561 of each of the grooves 560 and the surfaces 562 of the cladding 530 between the grooves 560. These vertical forces $P_V$ effect the core 520 equally. Therefore, while the entire core 520 may undergo a change in refractive index due to compression resulting from the vertical forces $P_V$, the forces $P_V$ do not result in a relative change in refractive index between regions A of the core in the grooves 560 and regions B of the core between the grooves 560. However, the horizontal forces $P_H$ acting on the side walls 563 of the grooves 560 result in compressive forces acting on the core 520 in regions A and expansive forces acting on the core in regions B. The difference between forces acting on the core 520 in regions A and B results in a difference in refractive index of the core in regions A and B, thereby producing a long period grating when the sensor 500 is exposed to pressure.

Figure 6:
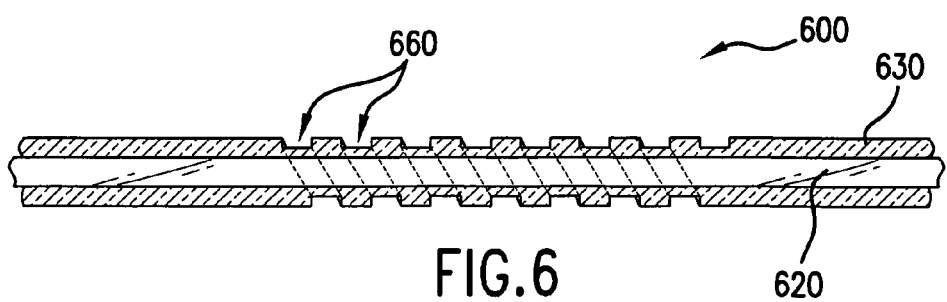
FIG. 6 is a cross sectional view of an intrinsic optical fiber sensor according to a seventh embodiment of the invention.

A cross sectional view of intrinsic sensor 600 according to yet another embodiment of the invention is illustrated in FIG. 6. Like the sensor 500, the sensor 600 has a series of circumferential grooves 660 formed in the cladding. In contrast to the circumferential grooves 560 of the sensor 500, which are formed perpendicular to the core 520, the circumferential grooves 660 of the sensor 600 are formed at an angle offset from the angle perpendicular to the core 620, resulting in oval-shaped circumferential grooves. In alternative embodiments, a helical groove is used in place of the plurality of circumferential grooves 660. In yet other embodiments, opposing pairs of groove segments, with each groove segment being formed in only a portion of a circumference of an optical fiber (rather than an entire circumference as shown in FIG. 6) could also be used.

It should be noted that intrinsic sensors such as those shown in FIGS. 5 and 6 may also be used in an extrinsic mode. This may be accomplished by, for example, applying opposing pressure to two smooth plates (e.g., two plates such as the plate 741 of FIG. 7 rather than one or two plates 742 with ridges 742a) adjacent to sections of optical fiber where grooves 560, 660 are formed, or by placing areas of fibers in which grooves 560, 660 have been formed into tubes with smooth inner surfaces such that the inner surface of the table compresses areas 562 between the grooves 560 when pressure is exerted on the tube.

Each of the embodiments discussed above has involved single core optical fibers. In such embodiments, when a long period grating is created in the core by changing the refractive index in localized sections of the core (whether it be through the creation of microbends in the core or through compression/expansion of the core), light is coupled from a mode guided by the core to a mode guided by the cladding (which is also sometimes referred to as an unguided mode) where it is attenuated. However, in other embodiments of the invention, composite optical fibers with two or more cores are used. In such embodiments, guided by one of the cores is coupled to a mode guided by a second core when a long period grating is created in the first core.

Figure 8:
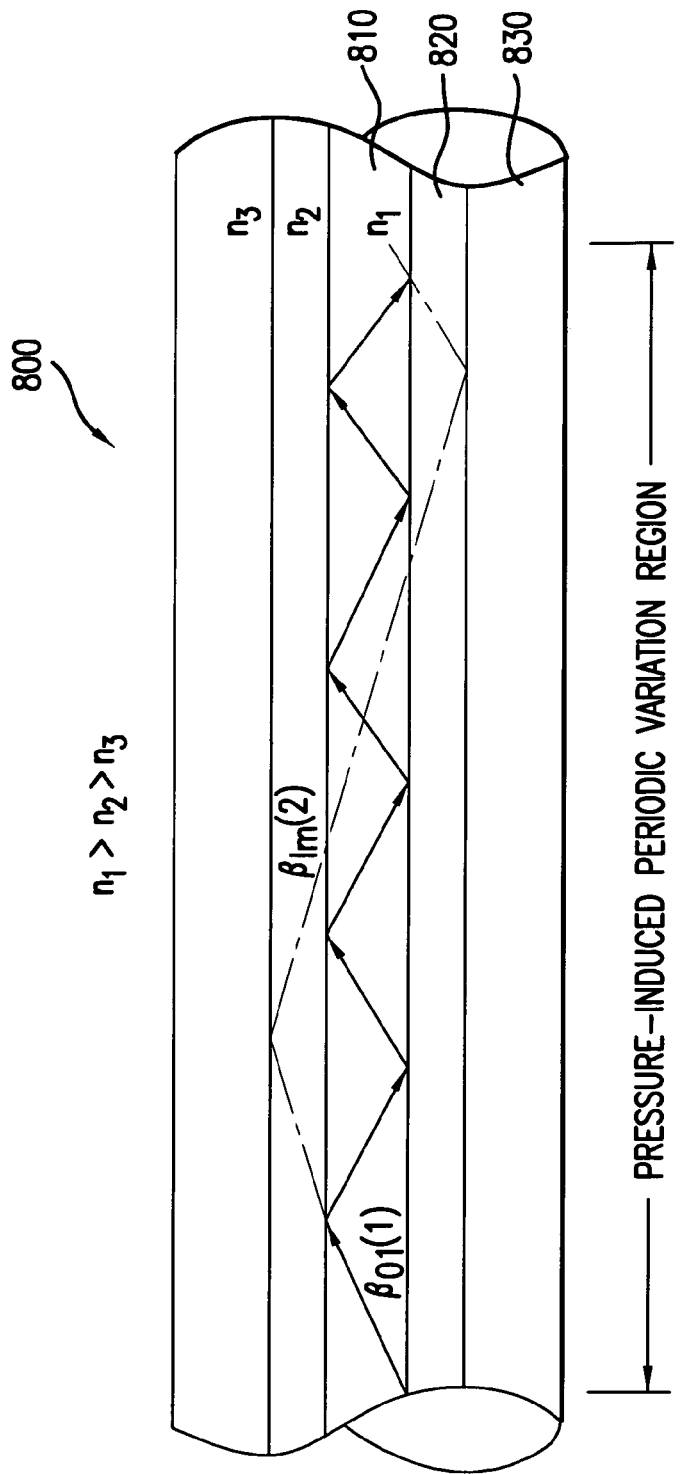
FIG. 8 is a side view of a concentric dual core optical fiber for use in an optical fiber sensor according to a ninth embodiment of the invention.

An example of a concentric dual core optical fiber 800 for use in such a sensor is illustrated in FIG. 8. The optical fiber 800 includes an inner core 810 having an index of refraction $n_1$ surrounded by a second core 820 having an index of refraction $n_2$ less than the index of refraction $n_1$ of the inner core 810. The second core 820 is surrounded by a cladding 830 having an index of refraction $n_3$ less than the index of refraction $n_2$ of the second core.a The inner core 810 supports the fundamental mode, denoted herein as $LP_{01}(1)$. The second core supports more than one mode, which shall be referred to herein as $LP_{1m}(2)$. When a pressure induced periodic variation is created in the fiber, observable optical coupling between the fundamental mode $LP_{01}(1)$ in the first core 810 and some of the modes $LP_{1m}(2)$ in the second core 820 can occur if two conditions are met. One such condition is:

$$\Delta L = (2\pi N)/|\beta_{01}(1) - \beta_{1m}(2)| \quad (1)$$

where:

$\Delta L$ is the spacing of the grating;

N is an integer, $\beta_{01}(1)$ is the propagation constant of the first core fundamental mode and $\beta_{1m}(2)$ is the propagation constant of the second core modes.

The other condition is:

$$\iint E_{01}(1) p(\rho,\theta) E_{1m}(2) d\sigma \neq 0 \quad (2)$$

where $E_{01}(1)$ is the electric field profile of the first core mode;

$p(\rho,\theta)$ represents the spatial distribution of the pressure-induced variation in the fiber index or geometry with $\rho$ and $\theta$ representing coordinates on a fiber cross-section;

$E_{1m}(2)$ is the electric field profile of a second core mode, and $\sigma$ is the fiber cross section.

Generally, the larger the integral value that the left-hand side of equation (2) is, the stronger the cross coupling will be.

As discussed above, coupling between the fundamental mode in the inner core 810 and modes in the second core 820 takes place at wavelengths that are dependent upon the periodic spacing of the long period grating. The long period grating can be created using several of the extrinsic and intrinsic methods discussed above. Such methods include, but are not limited to, disposing the fiber 800 in a tube 340 such as shown in FIG. 3 or a tube 440 as shown in FIGS. 4(a), (b); disposing the fiber 800 between a pair of plates 471, 472 as shown in FIG. 4(c) or 741, 742 as shown in FIG. 7; and creating grooves in the cladding of 830 the fiber 800 such as the grooves 560, 660 shown in FIGS. 5 and 6. As discussed above, temperature and/or pressure can be determined by measuring the spectral positions and/or amplitudes of the attenuation peaks in the first core 810 and/or the spectral positions and/or amplitudes of the transmission peaks in the second core 820.

With embodiments of the invention that employ concentric dual core fibers such as the fiber 800, it is possible to design the second core 820 such that it only supports a single or just a few modes. This would result in fewer spectral attenuation peaks present in the first core 810 than if the light from the first core were coupled to a cladding mode. This can be advantageous in many sensing applications, including applications wherein multiple sensors are multiplexed. If multiple sensors are implemented along a single fiber and these sensors are designed such that their spectral attenuation peaks are located in different spectral regions, fewer spectral attenuation peaks from each sensor imply that more sensors could be multiplexed without interfering with each other in a limited available spectral width.

Figure 9:
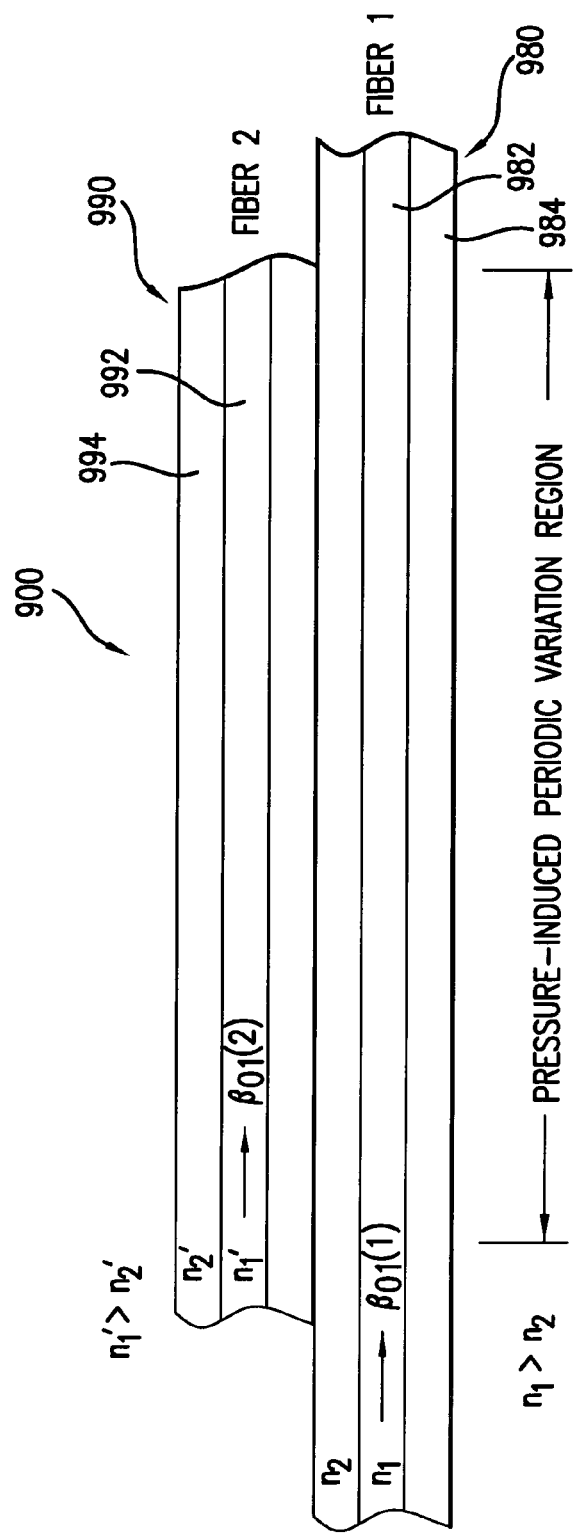
FIG. 9 is a side view of two optical fibers for use in a dual core optical fiber sensor according to a tenth embodiment of the invention.

A second dual core optical fiber sensor arrangement 900 is illustrated in FIG. 9. The sensor 900 is comprised of two separate fibers 980, 990. The first optical fiber 980 includes a core 982 with an index of refraction $n_1$ and a cladding 984 with an index of refraction n2 less than the index of refraction $n_1$ of the core 982. Similarly, the second optical fiber 990 includes a core 992 with an index of refraction $n'_1$ and a cladding 994 with an index of refraction $n'_2$ less than the index of refraction $n'_1$ of the core 992.

In this embodiment, both of the fibers 980, 990 are single mode fibers supporting only the fundamental modes and coupling occurs from one fiber core to the other. Moreover, the two fibers 980, 990 have different propagation constants (denoted as $\beta_{01}(1)$ and $\beta_{01}(2)$) resulting from some difference in the fiber cores or numerical apertures or the core structures. Because of the differences in propagation constants, no optical coupling between the two cores occurs in the absence of external perturbation to the fibers. However, when a pressure induced periodic grating is generated, optical coupling between the two cores 982, 992 takes place under the following conditions:

$$\Delta L = (2\pi N)/|\beta_{01}(1) - \beta_{01}(2)| \quad (3)$$

where $\beta_{01}(1)$ and $\beta_{01}(2)$ represent the propagation constants of the fundamental modes of the cores 982, 992 and the other values have the same meaning as in Equation 1 above. Since the optical coupling occurs only between the two modes, only one spectral attenuation peak may be obtained over a relatively wide spectral range of interest. As discussed above, this may be a major advantage for sensor multiplexing. The long period gratings in these dual fiber sensor embodiments may be created either intrinsically or extrinsically using opposing plates rather than tubes so that the two fibers can be accommodated between the plates. It is only necessary to create the grating in the fiber from which coupling occurs, but it should be noted that creating a grating in both fibers enhances coupling.

Figure 10:
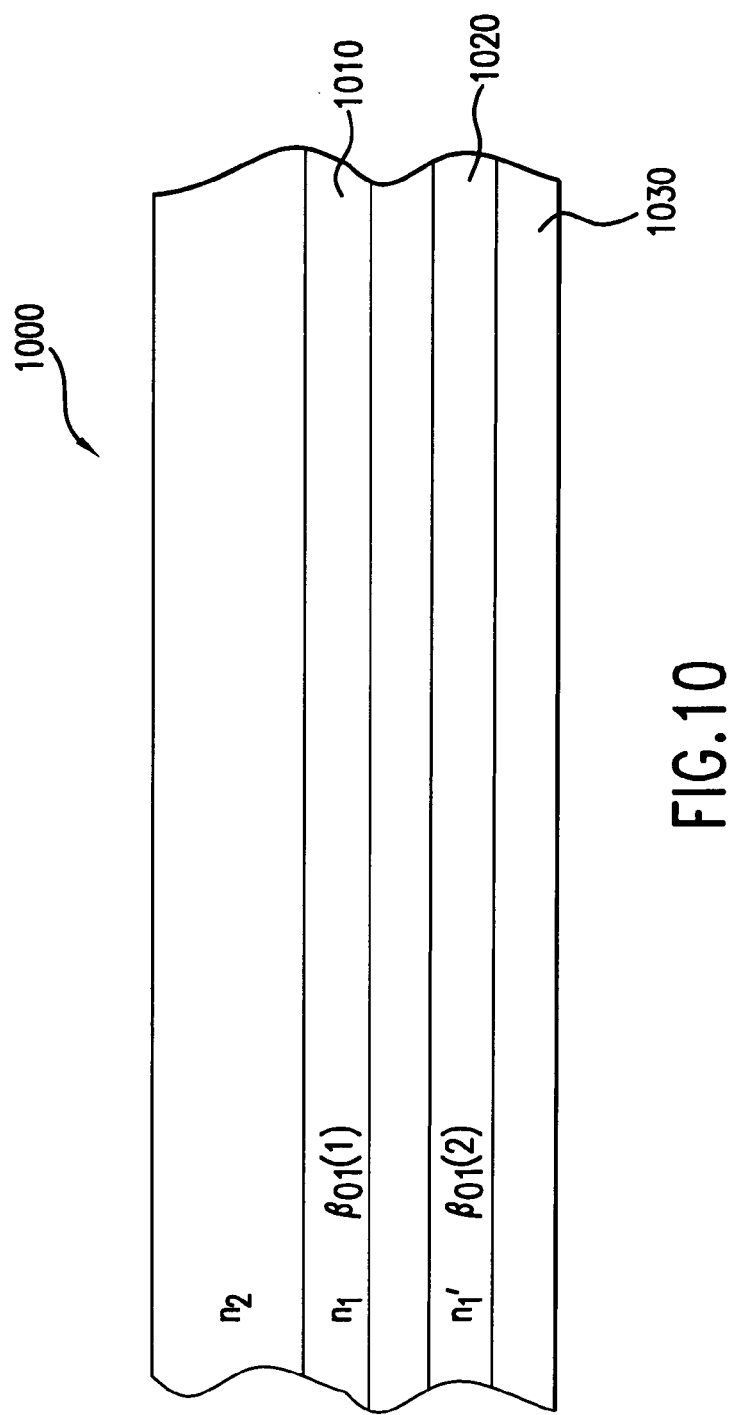
FIG. 10 is a side view of a side-by-side dual core optical fiber for use in a dual core optical sensor according to an eleventh embodiment of the invention.

Yet another embodiment of a dual core sensor 1000 is illustrated in FIG. 10. In this embodiment, two cores 1010, 1020 are surrounded by a single cladding 1030. The indices of refraction $n_1$ and $n'_1$ of the cores 1010, 1020 are both greater than the index of refraction $n_2$ of the cladding 1030. As with the sensor 900, coupling occurs between the fundamental modes $\beta_{01}(1)$ and $\beta_{01}(2)$ of the cores 1010, 1020 when a long period grating is created under the conditions defined in Equation 3 above. Any of the methods described in connection with sensor 800 of FIG. 8 may be utilized to create the long period grating, including both intrinsic and extrinsic methods and including both compression/expansion forces on the cores and micro-bending of the fibers.

It should be noted that attenuation peak width and amplitude can both be changed by varying the duty cycle of the ridges (that is, the ratio of the top surface of the ridges as compared to the space between ridges).

Obviously, numerous modifications and variations of the present invention are possible in light of the above teachings. It is therefore to be understood that within the scope of the appended claims, the invention may be practiced otherwise than as specifically described herein.

What is claimed is:

1. A method for determining a pressure and a temperature comprising the steps of:
    applying light to a first core of an optical fiber such that the light is guided by the core;
    creating a long period optical grating in the optical fiber by stressing the fiber such that a plurality of localized changes in an index of refraction in the first core are created, the optical grating causing at least some of the light guided by the first core to be coupled to a mode not guided by a fundamental mode of the first core;
    determining a wavelength at which is coupled to a mode not guided by the fundamental mode of the first core;
    calculating a temperature based at least in part on the wavelength;
    measuring an amount of light coupled to a mode not guided by the first core; and
    calculating a pressure based on the amount of light coupled to a mode not guided by the fundamental mode of the first core.

2. The method of claim 1, further comprising the steps of:
    disposing a portion of the optical fiber in a tube; and
    bonding the tube to the fiber at a plurality of locations such that the long period optical grating is formed when a force is exerted on the tube.

3. The method of claim 2, wherein the tube is bonded to the fiber in a plurality of circumferential bonds such that the first core is compressed in areas corresponding to the circumferential bonds when the force is exerted on the tube.

4. The method of claim 2, wherein the tube is bonded to the fiber in a plurality of locations on a top of the fiber and a plurality of locations on a bottom of the fiber such that a plurality of microbends are formed in the fiber when the force is exerted on the tube.

5. The method of claim 2, wherein the tube is glass.

6. The method of claim 2, wherein the tube is metal.

7. The method of claim 1, further comprising the steps of:
    disposing a portion of the optical fiber in a tube, an inside surface of the tube having a plurality of ridges formed thereon, the ridges being spaced apart; and
    exposing the tube to a force such that the ridges create the long period grating.

8. The method of claim 1, further comprising the steps of:
    placing at least one plate adjacent to the fiber, the plate having a plurality of spaced apart ridges formed thereon; and
    exposing the plate to a force such that the ridges create the long period grating.

9. The method of claim 8, wherein the ridges compress areas of the first core corresponding to the ridges.

10. The method of claim 8, wherein the ridges cause a plurality of microbends in the optical fiber.

11. The method of claim 1, wherein the mode not guided by the fundamental mode of the first core is a cladding mode.

12. The method of claim 1, wherein at least a portion of the first core is surrounded by a concentric second core, and wherein the mode not guided by the fundamental mode of the first core is a mode guided by the concentric second core.

13. The method of claim 1, further comprising the step of providing a spaced apart second core in close proximity to the first core, wherein the mode not guided by the fundamental mode of the first core is a mode guided by the spaced apart second core.

14. The method of claim 13, wherein the second core is surrounded by a second cladding, the second cladding being separate from a first cladding surrounding the first core.

15. The method of claim 13, wherein the second core and the first core are surrounded by a single cladding.

16. The method of claim 1, wherein the amount of light is determined by comparing an amplitude of light at a wavelength at which is coupled to a mode not guided by the fundamental mode of the first core to an amplitude of light at a wavelength at which no coupling occurs.

17. The method of claim 12, wherein the amount is measured by measuring light coupled to the concentric second core.

18. The method of claim 13, wherein the amount is measured by measuring light coupled to the spaced apart second core.

* * * * *